(12) United States Patent
Imhof et al.

(10) Patent No.: US 12,061,306 B2
(45) Date of Patent: Aug. 13, 2024

(54) CONSTRUCTING STRUCTURAL MODELS OF THE SUBSURFACE

(71) Applicant: ExxonMobil Technology and Engineering Company, Spring, TX (US)

(72) Inventors: Matthias Imhof, Katy, TX (US); Matthew S. Casey, Houston, TX (US); Colin J. Lyttle, Houston, TX (US); Ross Whitaker, Salt Lake City, UT (US); Shankar Sastry, Hillsboro, OR (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 809 days.

(21) Appl. No.: 15/969,492

(22) Filed: May 2, 2018

(65) Prior Publication Data

US 2018/0348401 A1 Dec. 6, 2018

Related U.S. Application Data

(60) Provisional application No. 62/513,249, filed on May 31, 2017.

(51) Int. Cl.
*G01V 20/00* (2024.01)
*G06T 17/05* (2011.01)
*G06T 17/20* (2006.01)

(52) U.S. Cl.
CPC ............. *G01V 20/00* (2024.01); *G06T 17/05* (2013.01); *G06T 17/20* (2013.01); *G01V 2210/66* (2013.01)

(58) Field of Classification Search
CPC ........ G01V 99/005; G06T 17/05; G06T 17/20
See application file for complete search history.

(56) References Cited

U.S. PATENT DOCUMENTS 6,106,561 A 8/2000 Farmer
6,138,076 A 10/2000 Graf et al.
(Continued)

FOREIGN PATENT DOCUMENTS

WO WO 2017/212305 A1 12/2017
WO WO-2017212305 A1 * 12/2017 ............. G01V 1/282

OTHER PUBLICATIONS

Fasshauer, Gregory (Chapter 6 of untitled textbook published online at least before Sep. 2006; https://web.archive.org/web/20060902125940/http://www.math.iit.edu/~fass/603_ch6.pdf) (Year: 2006) retrieved Sep. 20, 2021.*

(Continued)

*Primary Examiner* — Boris Gorney
*Assistant Examiner* — Joshua E. Jensen
(74) *Attorney, Agent, or Firm* — ExxonMobil Technology and Engineering Company—Law Department

(57) ABSTRACT

Method and systems are provided for building a structural model of the subsurface. The method may comprise obtaining discretized data that includes surfaces, polylines, points, or combinations thereof. The surfaces in the discretized data are segmented by other surfaces to form a number of segments. Each of the segments are fit to an implicit function. The implicit function for each of the segments is thresholded to create a number of implicit surfaces. The implicit surfaces are intersected to create a number of model surfaces. The structural model is then constructed from the model surfaces.

21 Claims, 10 Drawing Sheets

(56) References Cited

U.S. PATENT DOCUMENTS

| | | |
|---|---|---|
| 7,424,415 B2 | 9/2008 | Vassilev |
| 9,536,022 B1 | 1/2017 | Tertois et al. |
| 2013/0238297 A1 | 9/2013 | Lepage et al. |
| 2013/0246031 A1* | 9/2013 | Wu .................. G06F 30/20 |
| | | 703/10 |
| 2014/0222403 A1 | 8/2014 | Souche et al. |
| 2018/0031719 A1* | 2/2018 | Huang ............... G01V 99/005 |
| 2018/0321404 A1* | 11/2018 | Klinger ............... G01V 1/301 |
| 2019/0035148 A1* | 1/2019 | Owechko ............ G06T 17/20 |
| 2019/0243017 A1* | 8/2019 | Klinger ............... G01V 1/301 |

OTHER PUBLICATIONS

Fasshauer, Gregory (Chapter 6 of untitled textbook published online at least before Sep. 2006; https://web.archive.org/web/20060902125940/http://www.math.iit.edu/~fass/603_ch6.pdf) retrieved Sep. 20, 2021 (Year: 2006).*

Xie, Xianghua, and Majid Mirmehdi. "Radial basis function based level set interpolation and evolution for deformable modelling." Image and Vision Computing 29.2-3 (2011): 167-177. (Year: 2011).*

Chen, Jiaqin, et al. "Shape optimization with topological changes and parametric control." International journal for numerical methods in engineering 71.3 (2007): 313-346. (Year: 2007).*

* cited by examiner

100

602A

CONSTRUCTING STRUCTURAL MODELS OF THE SUBSURFACE

CROSS-REFERENCE TO RELATED APPLICATIONS

This application claims the benefit of U.S. Provisional Application No. 62/513,249 filed on May 31, 2017, the disclosure of which is incorporated herein by reference in its entirety.

FIELD OF THE INVENTION

The disclosure relates to methods and systems for constructing structural models of the subsurface. In particular the methods and systems can be used for incorporating implicit structural features into structural models, such as structural framework models, of the subsurface. The resulting models can then be used for various purposes, including for use in hydrocarbon operations, such as hydrocarbon exploration, development, and/or production operations.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Hydrocarbons are generally found in subsurface rock formations that can be termed "reservoirs." Removing hydrocarbons from reservoirs depends on numerous physical properties of the rock formations, such as the permeability of the rock containing the hydrocarbons, the ability of the hydrocarbons to flow through the rock formations, and the proportion of hydrocarbons present, among others.

Often, mathematical models termed "simulation models" are used to simulate hydrocarbon reservoirs in an effort to optimize the production of the hydrocarbons. A simulation model is a type of computational fluid dynamics simulation where a set of equations, such as partial differential equations (PDEs), which govern multi-phase, multi-component fluid flow through porous media and the connected facility network, is approximated and solved. This is typically an iterative, time-stepping process where a particular hydrocarbon production strategy is optimized.

Typically, simulation models discretize the underlying PDEs on a structured (or unstructured) grid, which represents the reservoir rock, wells, and surface facility network. State variables, such as pressure and saturation, are defined at each grid block. The goal of a simulation model is generally to understand the flow patterns of the underlying geology to optimize the production of hydrocarbons from a set of wells and surface facilities. During the past five decades, the size and complexity of simulation models have grown proportionally with the increased availability of computing capacity. Complex simulation models often require the use of parallel computing systems and algorithms to provide adequate simulation turnaround time.

Simulation models are based on structural models, such as structural framework models, which may be generated by the analysis of seismic data. The structural model of a reservoir includes geologic horizons and faults. The structural model establishes the geometrical foundation for a three-dimensional grid and provides some of the boundaries for volumes of similar rock and fluid properties. The resulting reservoir model forms the basis for volumetric computations, reservoir simulations, and facilities and well planning.

Features in structural models, such as fault crossings and the like, may often be imperfectly identified in the seismic data due to poor reflections and other issues. For example, near faults and intersections of faults, crushed rock and rubble may provide poor seismic reflections, making determinations of the exact intersection points difficult.

Existing methods for building a structural model of the subsurface may assume that their inputs, such as horizons and faults, are close to the expected output. The task may ensure consistency between the inputs and their interpretations, computation of the intersection or contacts between inputs, and their transformation to a uniform representation. Surfaces not quite touching within a specified distance may be extended or extrapolated until the surfaces touch. This may often be a manual step performed by an analyst. Similarly, surfaces intersecting each other may be truncated until the surfaces touch. In both situations, the surface representations need to be unified along their intersections. Even this limited problem is computationally costly as artifacts may need to be removed. Even when only one surface is moved or perturbed, the entire framework needs to be rebuilt as extrapolations and cut backs need to be recomputed without creation of artifacts. Interactive manipulation with the model becomes prohibitive. As a result, the structural model is typically only built once.

Therefore, there remains a need for methods and systems for constructing structural models that are interactive and allow for more easily updating the structural model. For example, there remains a need for methods and systems that allow the modeler to interactively explore scenarios and generate multiple frameworks to explore the uncertainty of the data and input parameters.

SUMMARY

One or more embodiments described herein provide a method for building a structural model, such as a structural framework model. The method may comprise accepting discretized data including surfaces, polylines, points, or combinations thereof. Surfaces in the discretized data are segmented by other surfaces to form a number of segments. Each of the segments are fit to an implicit function. The implicit function is thresholded for each of the segments to create a number of implicit surfaces. The implicit surfaces are intersected with each other to create a number of model surfaces. The structural model is constructed from the model surfaces.

Constructing the structural model may comprise tessellating each of the model surfaces to form a mesh over each of the model surfaces. Constructing the structural model may comprise tessellating the zones formed between each of the model surfaces to form a three-dimensional grid of cells in the zones.

The method may comprise extrapolating the implicit function for each of the segments to a boundary of a region of interest. The implicit function for each of the segments may comprise a radial basis function. The method may comprise determining a contact point between a horizon and a fault by an intersection of an implicit surface.

The method may comprise perturbing a surface using a rigid transformation of an implicit function representing the surface, wherein the surface includes a fault or a horizon.

Perturbing the surface may comprise scaling the surface. Perturbing the surface may comprise shifting the surface to a new location. Perturbing the surface may include rotating the surface.

The method may comprise perturbing a surface using a non-rigid transformation of an implicit function representing the surface, wherein the surface comprises a fault or a horizon. Perturbing the surface may comprise adjusting a depth value.

The method may comprise displaying the model surfaces. Displaying may comprise rendering the plurality of model surfaces using a ray tracing visualization. Displaying may comprise rendering a plurality of model surfaces using a volume renderer.

The method may comprise obtaining input for perturbation of a model surface. The method may comprise obtaining input for a contact order, a contact priority, or both for a model surface.

One or more embodiments described herein provide a system for constructing a structural model. The system may comprise a number of processors and a storage medium comprising discretized data comprising subsurface features comprising horizons, faults, or both. The system may comprise a machine-readable medium that includes instructions configured to direct at least one of the processors to partition the surface features into surface segments, fit the surface segments to implicit functions, threshold the implicit functions to create implicit surfaces, extrapolate the implicit surfaces to a boundary of a region of interest, intersect the implicit surfaces to create model surfaces by truncating the implicit surfaces in contacts with other implicit surfaces, create a structural model from the truncated implicit surfaces, and write the structural model to the storage medium.

The machine-readable medium may comprise instructions configured to direct at least one of the processors to tessellate the truncated implicit surfaces to form a mesh over the truncated implicit surfaces. The machine-readable medium may comprise instructions configured to direct at least one of the processors to tessellate a zone formed by truncated implicit surfaces to form a three-dimensional grid of cells within the zone. The machine-readable medium may comprise instructions configured to direct at least one of the processors to tessellate the truncated implicit surfaces to form a mesh over the truncated implicit surfaces, and extend the mesh into a zone formed by the truncated implicit surfaces to form a three-dimensional grid of cells within the zone.

The system may comprise a client system, and the machine-readable medium may include instructions configured to direct at least one of the processors to display the structural model at the client system. The machine-readable medium may comprise instructions configured to direct at least one of the plurality of processors to display the structural model at the client system. The machine-readable medium may comprise instructions configured to direct at least one of the processors to obtain instructions for the client system for perturbing an implicit surface. The machine-readable medium may comprise instructions configured to direct at least one of the processors to regenerate the structural model after an implicit surface has been perturbed. The machine-readable medium may comprise instructions configured to direct at least one of the plurality of processors to generate a simulation model from the structural model.

One or more embodiments described herein may provide a non-transitory, machine-readable medium comprising code that, when executed, directs a processor to fit an implicit function to a segment, wherein the segment includes discretized data representing a portion of a subsurface feature, and wherein the subsurface feature includes a horizon or a fault. The non-transitory, machine-readable medium may comprise code that, when executed, directs the processor to extrapolate the implicit function to have a boundary of a region of interest, and truncate the implicit function in a contact point with another implicit function.

The non-transitory, machine-readable medium may comprise code that, when executed, directs the processor to determine on which side of the other implicit function to truncate the implicit function. The non-transitory, machine-readable medium may comprise code that, when executed, directs the processor to form a mesh to the implicit function. The non-transitory, machine-readable medium may comprise code that, when executed, directs the processor to form a three-dimensional grid in a zone bounded by the implicit function, wherein the three-dimensional grid is an extension of a mesh formed over the implicit function.

The non-transitory, machine-readable medium may comprise code that, when executed, directs the processor to display the implicit function. The non-transitory, machine-readable medium may comprise code that, when executed, directs the processor to obtain an input specifying a deformation of the surface represented by the implicit function. The non-transitory, machine-readable medium may comprise code that, when executed, directs the processor to output a mesh formed to the implicit function and a three-dimensional grid formed in a zone bounded by the implicit function.

DESCRIPTION OF THE DRAWINGS

The advantages of the present techniques are better understood by referring to the following detailed description and the attached drawings.

DETAILED DESCRIPTION

Figure 1:
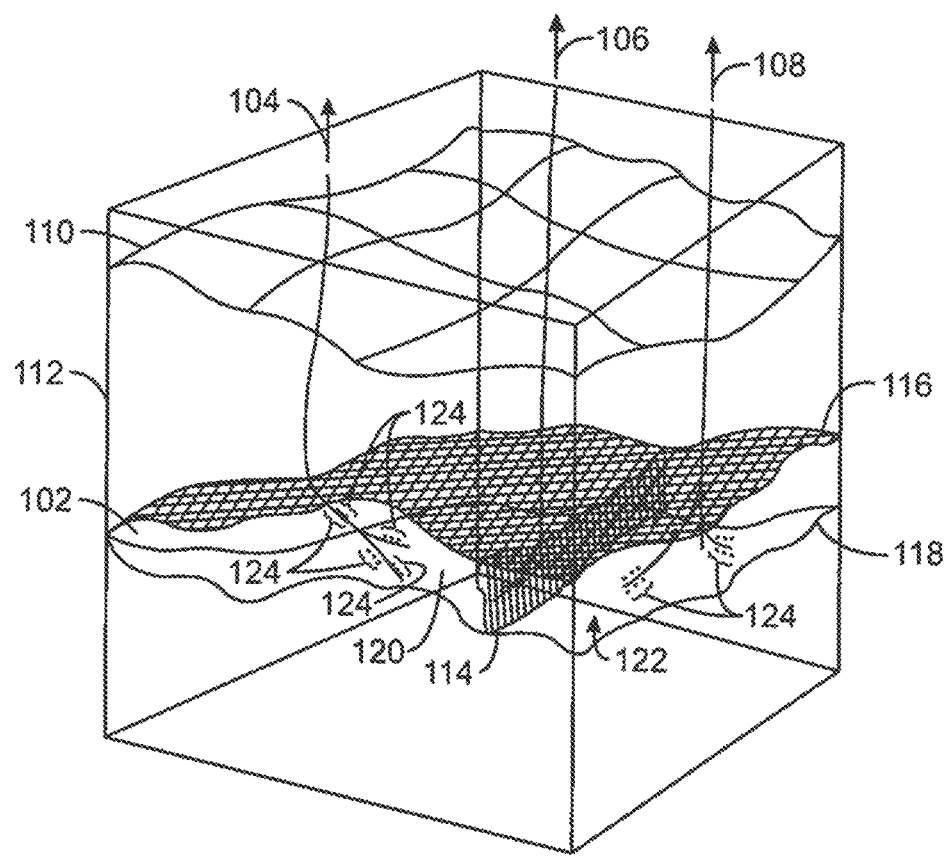
FIG. 1 is a schematic view of an exemplary reservoir.

In the following detailed description section, the specific embodiments of the present techniques are described in connection with preferred embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Computer-readable medium," "non-transitory, computer-readable medium," "machine-readable medium," or "non-transitory, machine readable medium" as used herein refers to any non-transitory, non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions. When the computer-readable media is configured as a database, it is to be understood that the database may be any type of database, such as relational, hierarchical, object-oriented, and/or the like.

"Concept" or "Scenario", as used herein, is one way to assemble the given inputs into a framework. Some or all of the inputs may be moved, deformed, or intersected in a different order to form a different scenario. For example, an initial scenario may have a first defined location for subsurface features, such as faults and horizons, while other scenarios may involve changing the locations of a fault, or a horizon, and the like.

As used herein, "to display," "displaying," or "visualizing" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as, without limitation, a CRT monitor, a LCD monitor, a plasma device, a flat panel device, or printer. The display device may include a device which has been calibrated through the use of any conventional software intended to be used in evaluating, correcting, and/or improving display results (for example, a color monitor that has been adjusted using monitor calibration software). Rather than (or in addition to) displaying the reference image on a display device, a method, consistent with the invention, may include providing a reference image to a subject.

"Exemplary" is used herein to mean "serving as an example, instance, or illustration." Any embodiment described herein as "exemplary" is not to be construed as preferred or advantageous over other embodiments.

"Flow simulation" is defined as a numerical method of simulating the transport of mass (typically fluids, such as oil, water and gas), energy, and momentum through a physical system using a computer. By way of example, the physical system may include a three-dimensional reservoir model, fluid properties, the number and locations of wells. Flow simulations may use a strategy, often called a well-management strategy, for controlling injection and production rates. These strategies are typically used to maintain reservoir pressure by replacing produced fluids with injected fluids, for example, water, or gas, among others. When a flow simulation correctly recreates a past reservoir performance, it is said to be "history matched," and a higher degree of confidence is placed in its ability to predict the future fluid behavior in the reservoir.

"Geologic model", as used herein, is a subsurface model (e.g., a three-dimensional model of the subsurface) having static properties. The geologic model may include any combinations of faults, horizons, facies, lithology and properties such as porosity, permeability, or the proportion of sand and shale.

"Grid", as used herein, is a representation of the volume within the framework formed by a set of non-overlapping polyhedrons or cells. Properties may be assigned to some or all of the polyhedrons. A grid may provide the spatial discretization for a partial differential equation (PDE) solver, such as a reservoir simulator or for the visualization of the geologic model or reservoir model.

"Mesh", as used herein, is a representation of framework surfaces where each surface is represented by a set of non-overlapping polygons. Properties may be assigned to some or all polygons, their faces, edges or nodes.

"Partition", as used herein, is the part of one specified surface that is wholly contained within one compartment. A surface thus consists of at least one partition.

"Permeability" is the capacity of a rock to transmit fluids through the interconnected pore spaces of the rock. Permeability may be measured using Darcy's Law: $Q=(k\ \Delta P\ A)/(\mu L)$, wherein Q=flow rate in cubic centimeters per second ($cm^3/s$), $\Delta P$=pressure drop in atmospheres (atm) across a cylinder having a length L in centimeters (cm) and a cross-sectional area A in squared centimeters ($cm^2$), t is fluid viscosity in centipoise (cp), and k is permeability (Darcy). The customary unit of measurement for permeability is the millidarcy. The term "relatively permeable" is defined, with respect to formations or portions thereof, as an average permeability of 10 millidarcy or more (for example, 10 or 100 millidarcy). The term "relatively low permeability" is defined, with respect to formations or portions thereof, as an average permeability of less than about 10 millidarcy. An impermeable layer generally has a permeability of less than about 0.1 millidarcy.

"Reservoir" or "reservoir formations" are typically pay zones (for example, hydrocarbon producing zones) that include sandstone, limestone, chalk, coal and some types of shale. Pay zones can vary in thickness from less than one foot (0.3048 meter (m)) to hundreds of feet (hundreds of m). The permeability of the reservoir formation provides the potential for production.

"Reservoir properties" and "reservoir property values" are defined as quantities representing physical attributes of rocks containing reservoir fluids. The term "reservoir properties" as used in this application includes both measurable and descriptive attributes. Examples of measurable reservoir property values include porosity, permeability, water saturation, and fracture density. Examples of descriptive reservoir property values include facies, lithology (for example, sandstone or carbonate), and environment-of-deposition (EOD). Reservoir properties may be populated into a reservoir framework to generate a reservoir model.

"Seismic Data," as used herein, is a representation of a subsurface region including horizons and faults. The seismic data may be in the form of a point cloud generated from the seismic analysis.

"Subsurface model", as used herein, is a reservoir model, geomechanical model or a geologic model.

"Simulate", as used herein, is the process of making a prediction related to the process being modeled (e.g., resource extraction based on the reservoir model). By way of example, a reservoir simulation is typically performed by execution of a reservoir-simulator computer program, e.g., a mathematical model of the reservoir, on a processor, which computes composition, pressure, or movement fluid as function of time and space for a specified scenario of injection and production wells by solving a set of reservoir fluid flow equations.

"Simulation model" or "reservoir model" refers to a specific mathematical representation of a real hydrocarbon reservoir, which may be considered to be a particular type of subsurface model. The model is a three-dimensional model of the subsurface that in addition to static properties such as porosity and permeability also has dynamic properties that vary over the timescale of resource extraction such as fluid composition, pressure, and relative permeability. Simulation models are used to conduct numerical experiments (reservoir simulations) regarding future performance of the field with the goal of determining the most profitable operating strategy. An engineer managing a hydrocarbon reservoir may create many different simulation models, possibly with varying degrees of complexity, in order to quantify the past performance of the reservoir and predict its future performance.

"Structural Model", "Structural Framework", or just "Framework", as used herein, refer to a geologic model formed from faults, horizons, other surfaces, and model boundaries, e.g., a geologic model containing only surfaces and polylines. A framework is thus formed by surfaces of geologic, engineering, planning or other technical relevance. The structural model may be used as a basic starting point for building a simulation model.

"Transmissibility" refers to the volumetric flow rate between two points at unit viscosity for a given pressure-drop. Transmissibility is a useful measure of connectivity. Transmissibility between any two compartments in a reservoir (fault blocks or geologic zones), or between the well and the reservoir (or particular geologic zones), or between injectors and producers, can all be useful for understanding connectivity in the reservoir.

"Well" or "wellbore" includes cased, cased and cemented, or open-hole wellbores, and may be any type of well, including, but not limited to, a producing well, an experimental well, an exploratory well, and the like. Wellbores may be vertical, horizontal, any angle between vertical and horizontal, deviated or non-deviated, and combinations thereof, for example a vertical well with a non-vertical component. Wellbores are typically drilled and then completed by positioning a casing string within the wellbore. Conventionally, the casing string is cemented to the well face by circulating cement into the annulus defined between the outer surface of the casing string and the wellbore face. The casing string, once embedded in cement within the well, is then perforated to allow fluid communication between the inside and outside of the tubulars across intervals of interest. The perforations allow for the flow of treating chemicals (or substances) from the inside of the casing string into the surrounding formations in order to stimulate the production or injection of fluids. Later, the perforations are used to receive the flow of hydrocarbons from the formations so that they may be delivered through the casing string to the surface, or to allow the continued injection of fluids for reservoir management or disposal purposes.

"Zone", "Container", or "Compartment", as used herein, is a volume contained in the framework bounded by surfaces that is assumed to exhibit similar fluid flow behavior or a volume in a subsurface model.

A practitioner constructing a structural framework may encounter ambiguity and uncertainty in seismic data. For example, boundaries between structural features such as horizons and faults may be difficult to determine due to poor reflections from broken rock near faults and other structural features. Accordingly, the practitioner may want to explore different scenarios, for example, making changes in the locations and intersections of structural features. Current modeling systems, however, are not conducive to the exploration of these scenarios as any change effectively triggers a complete rebuild of the structural framework. This is a very time-consuming process that involves manual interaction of a practitioner to return to the initial seismic data and re-enter points that may correspond to other locations for faults and horizons. Even perturbing a surface or changing a crosscutting relationship between surfaces tends to trigger a rebuild of the model.

A method is provided herein for creating a structural model or framework of a geologic model that is conducive to change. The method enables rapid updating of horizons, faults, and other features, which may enhance the exploration of different scenarios and interpretations in a cost-efficient manner. For example, each surface in a model may be represented with an implicit function defined over the model area or volume of interest.

The implicit functions for the subsurface features represents them in a manner that may be easily updated and provides an extrapolation that may be computed in advance, which lessens the need to repack locations. Surfaces may be broken across discontinuities into separate pieces that are individually represented by implicit functions. When a fault is moved, for example, the horizons on either side of the fault are already extrapolated by the implicit functions. Further, intersections of surfaces are already defined and only have to be extracted from their respective implicit representations. Non-rigid surface changes only affect the respective implicit functions and thus only involve updating select functions. Conceptual changes to the interpretation only affect the function selection order when extracting contacts and finalizing the surfaces and volumetric representations of the framework.

FIG. 1 is a schematic view 100 of an example of a reservoir 102. The reservoir 102, such as an oil or natural gas reservoir, can be a subsurface formation that may be accessed by drilling wells 104, 106, and 108 from the surface 110 through layers of overburden 112. The reservoir 102 may include zones defined by a number of surfaces, such as faults 114 and horizons 116 and 118. In this example, the surfaces 114, 116, and 118 divide the reservoir into two compartments, for example, zones 120 and 122, and may either restrict or enhance the flow of hydrocarbons.

The wells 104, 106, and 108 may be deviated, such as being directionally drilled to follow the reservoir 102. Further, the wells can be branched to increase the amount of hydrocarbon that may be produced from the reservoir, as shown for wells 104 and 108. The wells 104, 106, and 108, can have numerous areas with perforations 124, indicated as dots next to the wells, to provide a flow path for fluids, such as hydrocarbons, from the reservoir 102 into the wells 104, 106, and 108 for removal to the surface.

The location and paths for the wells 104, 106, and 108, and the location of the perforations 124, may be determined by simulations performed using a subsurface model, such as a reservoir model or geologic model, among others. The subsurface model may be a numerical equivalent of a three-dimensional geological map complemented by a description of physical quantities in the domain of interest. Subsurface models, such as reservoir models, are often used as inputs to reservoir simulation programs that predict the behavior of fluids contained therein and may also predict the behaviour of rocks under various scenarios of hydrocarbon recovery. When producing from a hydrocarbon reservoir, miscalculations or mistakes can be costly. For example, the additional expense of correcting a less than optimal locations for the wells 104, 106, and 108 or even the not contacting the reservoir. Using subsurface models in simulations provides a mechanism to identify which recovery options offer more economic, efficient, and effective development plans for a particular reservoir.

Construction of a subsurface model is a multistep process. First, a structural model or structural framework is created from surfaces that include faults, horizons, and if necessary, additional surfaces that bound the area of interest for the geologic model. The different surfaces define closed volumes often called zones, compartments, or containers, such as zones 120 and 122. As described herein, the structure model may be created using implicit functions to represent surfaces, which provides a mechanism to move or adjust the surfaces without having to completely re-create the structural model. This may allow modifications to determine the effects of changes on the zones 120 and 122, which may lead to higher production by modifying the location of the wells 104, 106, and 108 or the perforations 124, among others.

Using the structural model, each zone 120 and 122 may be meshed, or partitioned into small cells that are defined on a three-dimensional (3D) grid. Surfaces, such as the fault 114 and the horizons 116 and 118, may be represented as meshes, while the cells form the 3D grid may be created as extensions from the mesh on the surfaces 114, 116, and 118. To simplify FIG. 1, the fault 114 and the lower horizon 118 are not shown as a mesh. The meshing process, which may be termed tessellation herein, may start with the tessellation of the surfaces 114, 116, and 118 of the structural model followed by extension of the mesh on the surfaces to the volume of the zone 120 or 122.

Once the tessellation is finished, properties may be assigned to the surfaces of the cells, such as transmissibility or flow rates between cells, among others. Properties may also be assigned to individual cells, such as rock type, porosity, permeability, or oil saturation, among others.

The assignment of cell properties may be a multistep process where each cell is assigned a rock type, and then each rock type is assigned spatially-correlated reservoir properties and/or fluid properties. Each cell in the model is assigned a rock type. The distribution of these rock types within the model may be controlled by several methods, including map boundary polygons, rock type probability maps, or statistically emplaced based on concepts. Where available, rock type assignment may be based, at least in part, on well data, such as wellbores measurements.

Reservoir parameters may include porosity and permeability, but may also include measures of clay content, cementation factors, and other factors that affect the storage and deliverability of fluids contained in the pores of those rocks. Rock pores may be saturated with groundwater, oil, or gas. Fluid saturations may be assigned to the different cells to indicate which fraction of their pore space is filled with the specified fluids. Fluid saturations and other fluid properties may be assigned deterministically, for example, from wellbore measurements, or geostatistically.

Geostatistics may be used in subsurface models to interpolate observed data and to superimpose an expected degree of variability. Geostatistical techniques may be used to populate the cells with porosity and permeability values that are appropriate for the rock type of each cell. As an example, kriging, which uses the spatial correlation among data and intends to construct the interpolation via semi-variograms, may be used.

Geostatistical simulation may be used to produce more realistic spatial variability and to help assess spatial uncertainty between data. The geostatistical simulation may be based on variograms, training images, or parametric geological objects, among others. Perturbing surface properties or cell properties, such as rock type, reservoir properties or fluid properties, is a conventional process, which may utilize deterministic or geostatistical methods to assign them. The assignment may include choosing a different variogram for kriging or a different seed for a geostatistical simulation.

Thus, the ability to modify the structural model that underlines a simulation model not only enhances the exploration of various scenarios, it may also increase the probability of convergence of a solution. For example, a simulation model, or simulator, of the reservoir 102 is likely to find that the greatest changes occur in the vicinity of the wells 104, 106, and 108, and other reservoir features, such as the fault 114. Accordingly, it may be useful to manage areas in the vicinity of each of these features in single computational subdomain. A partition between computational subdomains that crosses a well 104, 106, and 108, fault 114, or other feature may slow convergence of the simulation, increase computational loading by increasing communication between computing units, or even prevent convergence, resulting in a failure to find a solution. The ability to shift the locations of surfaces 114, 116, or 118 may improve the yield from the wells 104, 106, and 108, and the computational efficiency of the simulations themselves.

Figure 2:
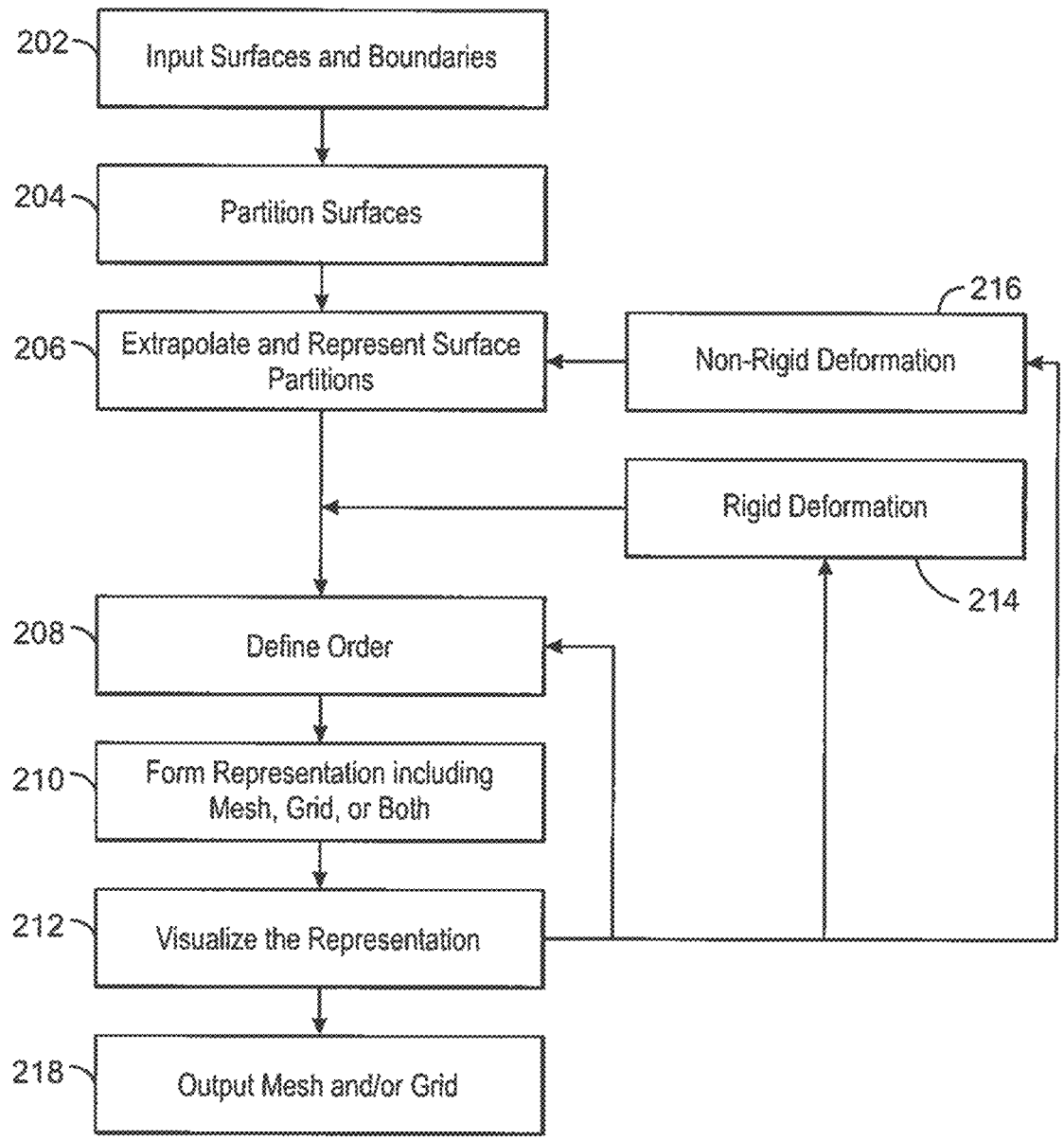
FIG. 2 is a flowchart of an exemplary method for including implicit structures for functional features in a structural model.

FIG. 2 is a flowchart of an example of a method 200 for including implicit structures for functional features in a structural model. The method 200 begins at block 202, which involves obtaining surfaces and boundaries. The surfaces and boundaries may include discretized data including surfaces, polylines, pointsets, or combinations thereof, including the model boundaries, provided as input, or imported, to a structural model. Surfaces might denote horizons, faults, model boundaries, or fluid contacts. Polylines may denote intersections between horizons (such as truncations or zero-thickness lines), intersections between faults and horizons (such as fault contacts), intersection between faults, or lines used to influence the generated model. Pointsets may denote well penetrations with regard to horizons or faults, such as well markers, or data used to influence the generated model such as a hard conditioning point for a surface. In one example of block 202, surfaces and polylines are treated as pointsets to facilitate formation of implicit functions. An analyst may perform a geologic or seismic interpretation using industry-standard or proprietary software, resulting in a set of surfaces to be inputted into the novel method.

There exist many open and proprietary representations for surfaces that are based on a set of specified points, also called nodes or vertices, where each point is defined by a triplet of x, y, and z coordinates. Some representations use explicit coordinates for x and y, while others define x and y by use of a regular two-dimensional mesh. Representations may be structured or unstructured. In a structured representation, surface-forming polygons are defined by a multi-dimensional enumeration of the points that may be implicit or explicit. In an unstructured representation, surface-forming polygons are defined by further specification of the polygon edges, often by use of a sequential point enumeration. Lastly, some representations forego polygons and simply provide a list of points, such as a point cloud. Any of these inputted surface representations, or any number of others, may be used with the present techniques.

In some examples, some surfaces may be defined by open or closed polylines or by constants. For example, the lateral model boundary, which may be termed the area of interest (AOI), may be specified by a closed polyline. In some examples, the lateral model boundary may be specified by constants. The vertical extend of the model may be specified by constants or may be set by explicitly provided surfaces. The combination of lateral and vertical model boundaries may specify the model volume of interest (VOI). In some examples, a surface serves double duty, both as an element of the structural model and as a boundary of a VOI. Examples are the use of a fault to laterally bound the VOI or the use of a horizon to vertically bound the VOI.

At block 204, the surfaces are partitioned. The inputted surfaces may be segmented by other surfaces at the intersections between the surfaces. In some examples, horizons may be segmented by faults as part of the initial interpretation and these horizon segments may then be inputted 202 into the method.

There are different methods that may be used to partition horizons by faults. Many interpretation and modeling systems contain the capability to create a framework and export the different surfaces and pieces thereof. In one embodiment, a proprietary or off-the-shelf, third-party interpretation and modeling system may be used to create a first framework model that is inputted into the method 200.

Computational geometry may be used to form a triangulated surface representation for each inputted surface and to intersect the resulting triangulated surfaces. This approach may form the basis for framework generation, but the implementation may be problematic as artifacts and exceptions have to be addressed. However, the calculations described with respect to block 204 are directed to the partitioning of some surfaces by other surfaces. The extrapolation described with respect to block 206 may overcome most artifacts. Many of the artifacts relate to the triangles and intersections thereof, such as spurious triangle intersections, rather than the set of their points. Other artifacts may be removed by filtering or spatial muting.

In another example of the calculation of block 204 may operate in two-dimensions. For example, faults are projected onto a map in X and Y dimensions, and zones are formed using these two-dimensional traces of the faults. Thereafter, points of the horizontal segments of the surfaces may be projected onto this map and assigned to one of the compartments.

In another example, the calculation of block 204 may operate in three-dimensions. In this example, every fault may be extended by extrapolation to, or beyond, the boundaries of the volume of interest. Generally, points of horizons may be classified by the side of the faults they reside. Every point so classified can be assigned to a compartment, and thus to a horizon partition, based on the set of these classifications. Techniques for extrapolating a surface, such as a fault may use implicit functional representations as described with respect to block 206. In some examples, horizon points that lie within a user-specified distance from a fault, and thus within a user-specified distance from a compartment or zone boundary, are not assigned to a horizon partition but either removed entirely or flagged. These horizon points may be ignored or modified in some of the subsequent operations.

At block 206, the surface partitions are extrapolated and represented. Each of the surfaces, or segments of surfaces, may be given a mathematical representation and expanded over the entire model domain. For example, a surface or segment may be defined by fitting the data points in the inputted seismic or geologic data to an implicit function. The function may be a linear function, such as a plane, or a more complex function, such as a quadratic, a spline fit, and the like. The segment or partition of a surface may then be extrapolated using the function, as described herein. While the function exists at points beyond an intersection with a terminating surface, the value of the function may be set to a selected value to indicate points where the surface is expected to exist. When intersecting surfaces are shifted, the value of the function may be changed to reflect that the segment exists at that point. In another example, the function value does not reflect the spatial extent of the surface. The surface exists everywhere but relationships between surfaces or their functional representations are used to indicate limits of existence.

An implicit function is a function that is defined implicitly by an implicit equation, for example, by associating one of the variables, the value, with the others, the arguments. One example may be a function $F(x, y, z)$ for a specified surface, in which the function $F(x, y, z)$ is equal to ($=$) 0 indicates that the point x, y, z is on the surface while the function $F(x, y, z)$ is not equal to ($\neq$) 0 means that the point x, y, z is on not this surface.

It may be advantageous to combine the implicit representations of the partitions of multiple surfaces into one implicit function. Each surface that is represented by this function is characterized by a unique value s, which results in the definition of the surface by $F(x, y, z)=s$. A set of partitions belonging to the same compartment can be characterized jointly using a function $F(x, y, z)$ and a set of values $S=(s_0, s_1, \ldots)$. The advantage of representing multiple partitions with the same function is that constraints between these partitions can be enforced. For example, a continuous function inhibits the intersection of partitions associated with this function. Another method of combining the implicit representation of multiple surfaces is to define $F_1(x, y, z)=F_0(x, y, z)+\Delta z(x,y)$ or $F_1(x, y, z)=F_0(x, y, z)+\Delta(x, y, z)$ which may be applied repeatedly.

A preferred class of implicit functions is defined by sums of radial basis functions. A radial basis function is a real-valued function whose value depends only on the distance from the origin, so that $f(x)=f(\|x\|)$ where $x=(x, y, z)$. Alternatively, a distance from some other point c, also called the center, may be chosen to yield $f(x-c)=f(\|x-c\|)$. Any function $f$ that satisfies the property $f(x)=f(\|x\|)$ is a radial basis function. The norm is usually Euclidean distance, although other distance functions are also possible. Sums of radial functions may be used to approximate given functions. The radial functions specified in such a sum serve as radial basis functions for the expansion or approximation of the given function, and thus are commonly termed radial basis functions.

Radial basis functions may be used to build up function approximations of the form $F(x)=\Sigma w_i\, f_i(\|x-c\|)$, where the approximating function $F(x)$ is represented as a sum of N different radial basis functions $f_i$, each associated with a different center $c_i$ and weighted by an appropriate coefficient $w_i$. The weights $w_i$ can be estimated using linear least squares methods, because the approximating function is linear in the weights. In an example, the representation $F(x)$ for a surface partition specified by a set of points $x_j$ and a set of radial basis functions $f_i(x-c)$ may be found by solving for the weight $w_i$ using $\Sigma w_i\, f_i(\|x_j-c_i\|)\approx 0$. Other variations may be used depending on the equations selected for the example, such as solving for the weight $w_i$ using $\Sigma w_i f_i(\|x_j-c_i\|)-W_0\approx 0$.

Radial basis functions that may be used in some examples of block 206, include Gaussian functions ($e^{-(\varepsilon r)}$), multiquadratic functions ($\sqrt{1+(\varepsilon r)^2}$), inverse quadratic functions ($1/[1+(\varepsilon r)^2]$), inverse multiquadratic ($1/\sqrt{1+(\varepsilon r)^2}$), or polyharmonic functions (for example with $r^k$ for odd k and $r^k \ln(r)$ for even k), among others. Polyharmonic functions include the linear functions (r), cubic functions ($r^3$), quintic functions ($r^5$), and thin plate spline functions ($r^2 \ln(r)$). In these functions, the parameter $r=\|x-c\|$ is used for notational convenience. The parameter e is a scaling coefficient that may be approximately selected to be of magnitude $E=1/\|c_i-c_j\|$. For computation efficiency, it may be advantageous to use radial basis functions with compact support that vanish beyond a finite distance from the center which renders the matrix W sparse and increases numerically stability.

The functions may be evaluated at any specified point x and thus an expansion of a surface partition based on the radial basis functions provides an extrapolation beyond the original region of support of the inputted data or original surface partition. Some radial functions may vanish with increasing distance from their center points, some may approach an asymptote, and some may shoot towards positive or negative infinity. However, a linear combination thereof may be evaluated to determine whether the linear combination equals a specified value at a location or not. The most commonly used specified value is zero, indicating that the surface is present at that location.

The radial basis function expansion may be signed. If a surface or horizon partition is represented by $F(x)=\Sigma w_i f_i(\|x-c_i\|)$, then a point x is on the surface, fault, or horizon partition if $F(x)=0$. The point x is on the positive side of the surface, fault, or horizon partition if $F(x)$ greater than (>) 0 but on the negative side of the surface or horizon partition if $F(x)$ less than (<) 0. For signed basis functions, the sign may be used to define the fault blocks relative to the specified fault. Specified points may be assigned to fault blocks with regard to a plurality of faults.

Returning to block 204, in an example of horizon partitioning, fault surfaces may first be represented by signed radial basis function expansions. Generally, points of horizons may be classified by the side of the faults they reside. Points that share the same classifications reside in the same compartment and can be assigned to this specific compartment. Points of a horizon that are assigned to the same compartment, or zone, form a partition. Then, at block 206, each partition may be expanded using radial basis functions, which may be signed.

In some examples, the calculations of blocks 204 and 206 may first be performed for fault surfaces. The calculation of blocks 204 and 206 may then be repeated for horizon surfaces to leverage the signed radial basis functions of the faults for the partitioning of the horizons.

At block 206, the user or algorithm implementing the extrapolations may represent the surfaces or horizon partitions by radial basis functions. For example, a selection of the radio basis functions to be used may be made. In one embodiment, a thin plate spline function, $r^2 \ln(r)$, may be used, because it tends to minimize curvature changes and provides an interpolation of scattered data. A thin plate spline fit resists bending, implying a penalty involving the smoothness of the fitted surface.

The number of terms in the radial basis function expansion $\Sigma w_i f_i(\|x-c_i\|)$ that are used to approximate a specific surface or partition may be selected. In some examples, the number of terms is specified. A convergence threshold may also be specified. Terms are added to the expansion until a convergence criterion is satisfied. The convergence criterion may include an extremal misfit, an average misfit, or a misfit variance, among others. A tradeoff curve between number of terms and misfit may be used to limit overfitting.

The location of the centers may be selected. For each $f_i$ in $\Sigma w_i f_i(\|x-c_i\|)$, a center, $c_i$, may be specified. In one example, the centers are selected by direct sampling of the provided surface or partition points. In another example, the centers are selected by sampling the convex hull of the provided surface or partition points. In another example, the centers are selected by covering an area derived from the provided surface or partition points with a regular mesh. In another example, centers are added at locations with large misfits and the weights of the basis functions are recomputed or updated with all centers including the newly added ones.

At block 208, an order is defined. The order may be an order of interactions, which is specified to represent a structural and/or stratigraphic interpretation of the inputted surfaces, for example, a specification of how intersecting surfaces terminate each other to form model surfaces. Any pair of surfaces may intersect at some location because each surface is extrapolated beyond its original support. However, the representation of the surface partitions may not be optimal for subsequent use cases, but may be adjusted to explore further scenarios.

The intersection of the surfaces may provide a structural framework that includes the implicit functions for the various surfaces that are to be present in the structural model. The structural model can then be constructed from the model surfaces.

To complete the construction of the structural model, at block 210, a mesh and grid may be formed. As described herein, a mesh may be a tessellation of a surface, while a grid may be a three dimensional tessellation of a volume. The model surfaces may be tessellated to form a mesh over each of the surfaces, for example, a surfacic mesh may be laid over specified surfaces or some specified partitions of the surfaces. In some examples, a volumetric grid, or 3D grid, may then be formed, for example, extending from the mesh at each of the surfaces surrounding a zone, and coupling the mesh on each of the surfaces. In some examples, a grid may be created in zones and adjacent faces of its cells may be used to define the meshes. This may be used to enforce compatibility between grid and mesh by sharing points (vertices), edges, and faces.

In some examples, all specified surfaces, partitions, or compartments are tessellated conjunctively by gridding or meshing. This may help to ensure compatibility of the resulting tessellation by sharing points (vertices), edges, and faces. The tessellation may be at different levels of resolution, for example, with smaller cells used in more active regions, such as near wells or faults, among others.

In some examples, the specified surfaces, partitions, or compartments may be grouped into sets that are tessellated independently. In these examples, sets of surfaces, partitions, or compartments are tessellated independently which may be more efficient due to the smaller number of constraints and may be performed in parallel to each other.

As described herein, implicit functions may be used to represent surfaces. Accordingly, surface compliant tessellation, such as gridding, meshing, or both, uses tessellation that uses the implicit functions as boundaries. Any point may be tested for being located on a specified surface by evaluation of the function at the point, and comparing the result against the value s characteristic for the surface. Unless multiple surfaces are represented by one function, the value s may be zero.

Signed implicit functions may be used as representations. Given two points and an implicit function representing a surface, a determination may be made as to whether the surface intersects the line segment formed by the points. If the signs of the function evaluations differ, then the surface may pass through the segment an odd number of times. If the signs match, then the surface may pass through this segment an even number of times. For signed functions, a root finder like bisection, the secant method, or regula falsi, among others, may be used to locate the surface.

In some examples, an initial grid may be laid over specified zones. Cells may then be bisected or split based on the application of a root finder. When a cell is split, neighboring cells may be updated to preserve compatibility of points, edges, and faces. By iterating over the cells and surfaces, or partitions thereof, the model may then be tessellated to the implicit function representations. The grid evolves from its initial state to one aligned with the implicit representations of the surfaces. The initial grid may provide the lower limit to resolution.

In some examples, the initial grid may be formed from tetrahedrons. A tetrahedron may be split in such a manner that all the resulting components form tetrahedrons again. In some examples, the initial grid may be formed from hexahedrons.

A threshold distance may be used when splitting cells. If a surface passes through an existing cell within the specified threshold distance from one its vertices, then the surface may then be moved to pass through the existing vertex rather than splitting the cell. Similarly, if a surface passes through an existing cell within a specified threshold distance from two of its vertices, then the surface is moved to pass through the two vertices, and thus the corresponding edge rather than splitting the cell. In some examples, if a distance from vertices falls short of the threshold, the existing vertices can be moved to the surface. In either case, the specified threshold defines the upper resolution limit to the resulting tessellation.

At block 212, the representation is visualized. The representation, the surface meshes or the 3D grid may be visualized for interpretation and quality control. In an example, the meshes, grids, or both, may be directly rendered. Rendering of meshes is an established field in computer graphics and commonly implemented natively in hardware supported by software.

In another example, ray tracing of implicit functions may be used. Ray tracing is technology within the field of computer graphics to render 3D objects on a monitor. When visualization is performed by ray tracing of the implicit functions, then the calculations described with respect to blocks 212 and 210 may be performed in reverse order. For example, the framework may first be visualized and modified until it meets expectations and needs, after which it is converted to a grid, mesh, or both.

The visualization described with respect to block 212 may enable interactive editing and modification of the framework to be performed as part of blocks 208, 214 and 216. Based on the inputted surfaces, the generated model may not meet expectations. As examples, a surface may not pass through a known well marker point, two faults may exhibit the wrong major-minor relationship, or a fault contact may flip polarity laterally, wherein in some parts of the seismic data, or the generated model, the fault may appear to be a reverse fault, while in others it appears to be a normal fault.

A user or an algorithm may affect any number of changes from the visual representation of block 212. For example, the user or the algorithm may change the interaction order of the surfaces. Further, the user or the algorithm may deform a surface, or a partition of a surface. This may be performed, for example, by a rigid deformation of surfaces, as indicated at block 214, or by a non-rigid deformation of surfaces, as indicated at block 216.

Block 214 represents a rigid deformation of a surface. A surface may be shifted or rotated, but the points of the surface do not change their relative locations. These changes may be accomplished by coordinate transformation. In an example in which the implicit functions are based on radial basis functions, this may be performed by transformation of the centers $c \rightarrow c'=T(c)$ where c' denotes the centers used to compute the implicit functions and c denotes the centers after deformation. The implicit functions are evaluated as $F(T(x, y, z))$. Implicit surfaces can also be scaled so long as the scaling parameter e, which is used for some radial basis functions, is also rescaled. Affine transformations may be an example of rigid transformations. An affine transformation preserves collinearity (i.e., all point lying on a line still lie on a line after transformation) and the ratio of distances (e.g., the midpoint of a line segment remains the midpoint after transformation). In some example, general transformations $T(x, y, z)$ where $T(x, y, z)$ is bijective within the volume of interest (VOI). In some example, general transformations are used, but preferably, general transformations are treated as non-rigid transformation and the implicit functions are recomputed in block 216.

If the visualization prompts the analyst to changes the interaction order at block 212, process flow may return to block 208, to repeat the structural and/or stratigraphic interpretation of the inputted surfaces. Block 208 provides a mechanism for the user to interact with surface or partition selection, the surface interaction order, or any other change that does not require a modification of the implicit functions.

If a surface is rigidly deformed at block 214, process flow may return to block 208, to repeat the structural and/or stratigraphic interpretation of the inputted surfaces. If the surface is non-rigidly deformed at block 216, then the extrapolation and representation of surface partitions may be repeated at block 206.

At block 218, the mesh and/or gird is output. The generated meshes, grids, or both, of the structural model may be exported for use in other operations. For example, the exported structural model may be used to build a simulation model by the assignment of rock types and properties to each of the cells, as described herein. Results may be outputted to memory, files, or a network.

Not all of the blocks shown in the method 200 may be used in every example. Further, the specific ordering of the blocks shown in the method 200 is simply for exemplary purposes. Some blocks of the method 200 may be omitted, repeated, performed in different order, or augmented with additional blocks not shown in the method 200. For example, the first grid of block 210 may be replaced with a second grid that conforms to the generated structural model but also allows specification of layer number, layer thicknesses or layering style. In another example, the first grid of block 210 may be replaced with a second grid that puts layers of cells into zones that conform both to the structural model and a geologic concept model. Some blocks may be performed sequentially, while others are executed in parallel. In some examples, the order definition described with respect to block 208 may be performed after the entry of the surfaces the boundaries described with respect to block 202. Further, block 208 may be performed twice, once after the surfaces and boundaries are entered in block 202 and again before the generation of the mesh and grid described with respect to block 210.

The implicit function representation provides a mechanism to extrapolate surfaces beyond the support of the inputted data. The resulting framework may then be limited to the specified area of interest or volume of interest by a boundary that truncates all other surfaces. In some examples, an open boundary around the area or volume of interest is acceptable. The volume of interest may be bounded by one or more implicit surfaces.

The boundary around the area or volume of interest may be an integral part of the generated tessellation. Specifically, the boundary may be completely covered by the mesh or cell faces.

In some examples, the area of interest may be specified by multiple inputted surfaces. Some fault surfaces may form part of the boundary, such as in a fault-bounded model. The area of interest may be specified by one or multiple polylines that are extruded vertically. In addition to lateral boundaries, the framework may be vertically bounded. A vertical boundary may be formed from a specified horizon, a specified fault, such as a low angle fault, or one or multiple specified (depth) values, or a combination thereof. A boundary surface ranks very high in the truncation order established at block 208 because it truncates the other surfaces, including horizons, faults, and other boundary surfaces. A boundary surface stops the volumetric gridding to the implicit functions, as described with respect to block 210, because the framework outside remains devoid of cells. The application of the method 200 is further clarified by the examples discussed with respect to FIGS. 3A to 8.

FIGS. 3A to 3E are schematic diagrams of an example 300 of the application of the techniques described herein. In the example 300, a fault 302 and a horizon 304 are inputted. On the left-hand side 306 of the fault 302, the left horizon partition 304A, located in the foot-wall compartment, is interpreted to extend beyond the fault 302 into the hanging-wall compartment on the right-hand side 308. On the right-hand side 308 of the fault 302, the right horizon partition 304B does not reach the fault 302, but terminates prematurely.

Figure 3A:
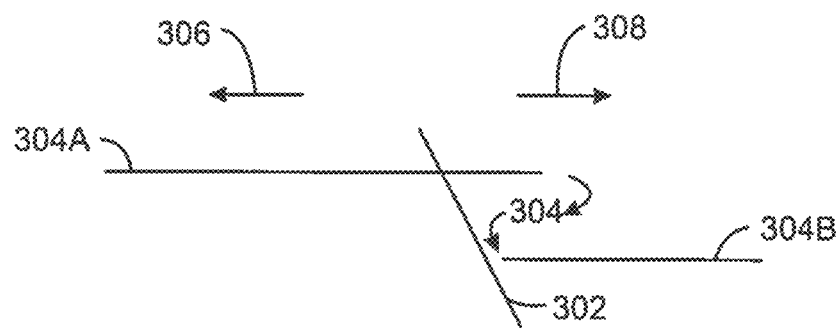
FIGS. 3A to 3E are schematic diagrams of the application of techniques described herein.
Figure 3B:
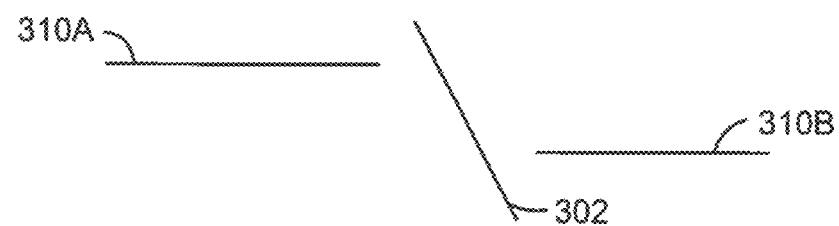

As described with respect to block 204 of FIG. 2, the horizon 304 may be partitioned using the fault 302. As the quality of the interpretation is often degraded near faults, for example, indicated by the partial overlap of the partitions 304A and 304B to the right of the fault 302 in FIG. 3A, the partitions may be cut back to form partitions 310A and 310B, as shown in FIG. 3B.

Figure 3C:
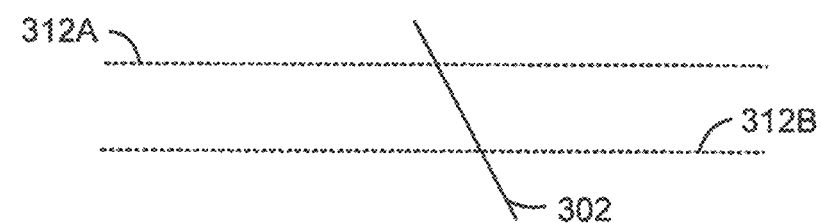

As described with respect to block 206 of FIG. 2, the extrapolation may be performed by disregarding the fault 302 and extrapolating the partitions 310A and 310B beyond their support to form extrapolations 312A and 312B, as shown in FIG. 3C. The extrapolations 312A and 312B cover an area of interest (AOI), for example, being extrapolated to, or beyond, the edges of the model.

Figure 3D:
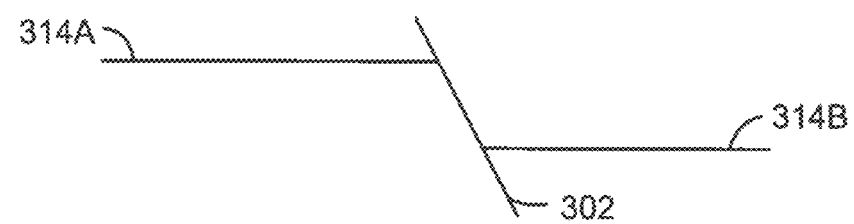
Figure 3E:
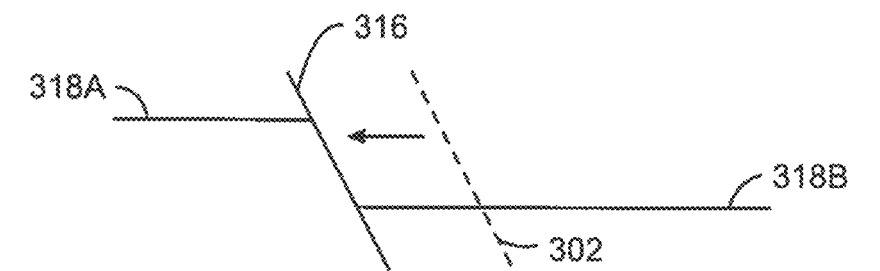

To form a watertight framework, after consulting the order of interactions, as described with respect to block 208 of FIG. 2, the extrapolations 312A and 312B are intersected by the fault 302 and the extraneous pieces are removed, for example, by excluding them during mesh and grid formation in block 210, as shown in FIG. 3D. This forms partitions 314A and 314B. Removal or exclusion of the superfluous segments is aided by signed implicit functions and the order definition.

In this example 300, the potential of the method may be indicated by shifting fault 302 to a different location forming fault 316. Because the horizon extrapolations 312A and 312B already exist, intersecting the fault 316 with the extrapolations 312A and 312B provides a new framework having the fault 316 and the partitions 318A and 318B. Thus, there is no need to repeat partitioning, cut-backs, or extrapolation.

Figure 4A:
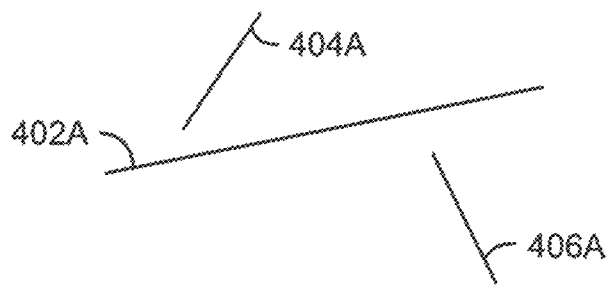
FIGS. 4A to 4C are schematic diagrams of the extrapolation of surfaces through intersecting surfaces.
Figure 4B:
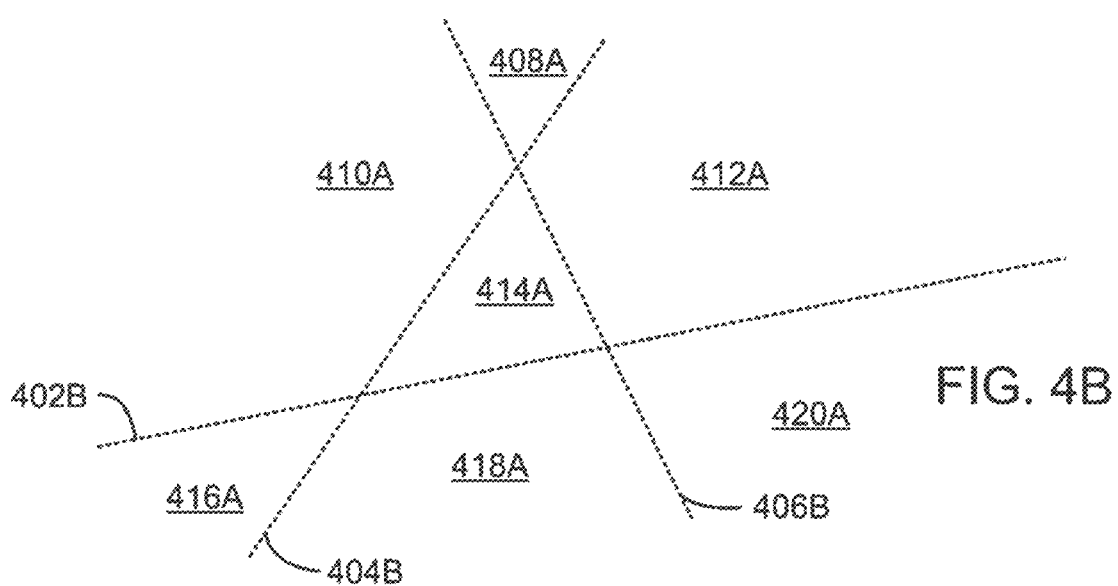
Figure 4C:
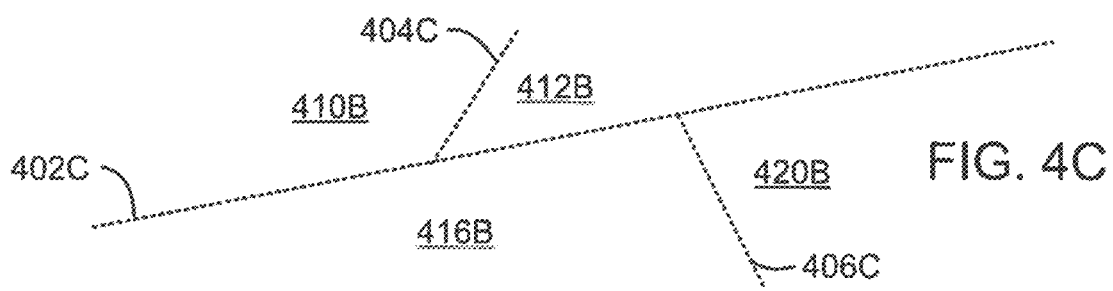

FIGS. 4A to 4C are schematic diagrams of an example of the extrapolation of surfaces through intersecting surfaces. In this example, the original interpretation includes three fault surfaces 402A, 404A, and 406A, as shown in FIG. 4A. None of these fault surfaces intersect, although the likely interpretation is that the minor faults 404A and 406A both terminate at the major fault 402A.

The inputted data may be converted to an implicit function representation and extrapolated, for example, as described with respect to block 206 of FIG. 2. The implicit function representations 402B, 404B, and 406B are shown in FIG. 4B. As shown in FIG. 4B, implicit function representation 404B not only intersects implicit function representation 402B, but pushes through and exists now on either side of implicit function representation 402B. Similarly, implicit function representation 406B intersects implicit function representation 402B and extends to the other side of implicit function representation 402B. Moreover, implicit function representations 404B and 406B also intersect even though the inputted faults did not suggest their intersection. Seven compartments 410A to 420A are formed by the intersection of the surfaces, compartments 408A to 420A.

The imposition of the order of surface interactions to control the extraneous surface segments and compartments, for example, as described with respect to block 208, results in the arrangement shown in FIG. 4C. The minor faults 404C and 406C now terminate on the major fault 402C. The minor faults 404C and 406C are each restricted to the expected sides of the major fault 402C. Further, the intersection of the faults and imposition of the order of surface interactions creates four compartments 410B, 412B, 416B, and 420B.

The three tasks in 208 may capture the surface interactions, to propagate their effects to the subsequent blocks 210, 212, and 218. This may provide a user with a mechanism to change the surface interactions.

Any number of data structures or variations may be used to assist in the calculations. For example, the surface interactions may be represented based on a tree structure that captures adjudication and sidedness. Further, not only surfaces, but also their partitions may be assigned to the tree. A table may be used to link surface sidedness, partitions, and compartments. An initial order may be established based on heuristic rules, such as indicating that a large surface has a high probability of terminating a smaller surface, among others. If one surface separates another surface into two partitions, then the largest partition is likely to terminate on the surface.

Further, horizons may be classified as erosional, unconformal, onlapping, downlapping, or conformal, among others. The classes may be used to establish an order between the horizons.

Figure 5A:
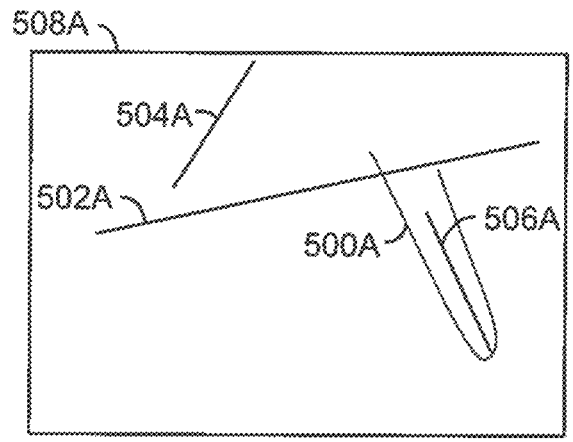
FIGS. 5A to 5C are schematic diagrams of the use of a clipping surface.
Figure 5B:
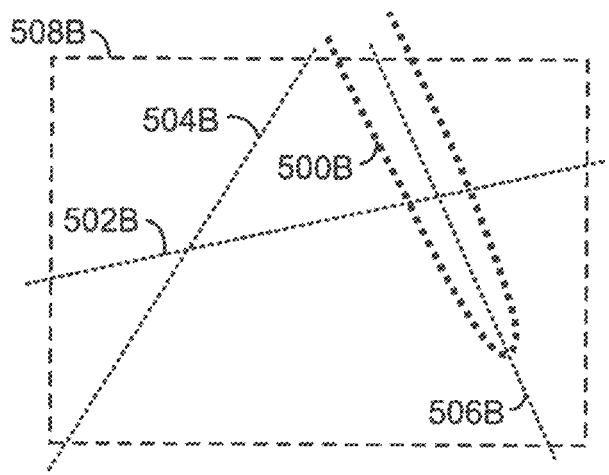
Figure 5C:
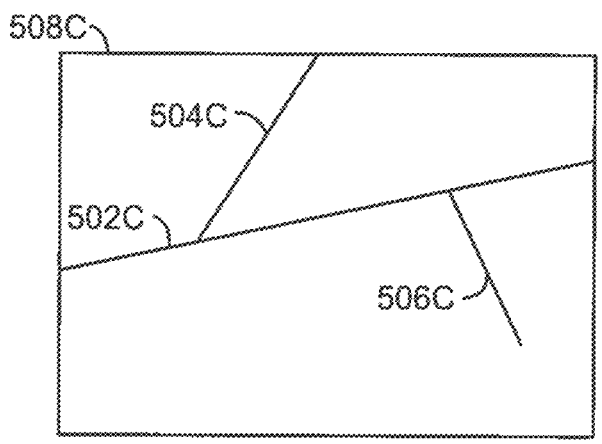

FIGS. 5A to 5C are schematic diagrams of an example of the use of a clipping surface 500A. As used herein, a clipping surface 500A may be used to truncate another surface. In some examples, clipping surface 500A may be meshed or gridded.

The example includes one major fault 502A that is intended to truncate two minor faults 504A and 506A. Also given is the area of interest or model boundary 508A that defines the extent of the final model. Neither fault 504A nor 506A intersect the major fault 502A and the boundary 508A. It may be assumed from rules or a user interaction that both faults 504A and 506A intersect fault 502A and that minor fault 504A extends at least to the boundary 508A of the volume of interest, while minor fault 506A terminates before reaching the boundary 508A. In other words, minor fault 506A is a partial fault.

The faults and boundary 502A to 508A are converted to implicit-function representations 502B to 508B that extrapolates the faults 502B, 504B, and 506B beyond the model boundary 508A. Because the model boundary 508A is closed, the model boundary 508A may only be extended in the vertical direction. The current truncation orders may not generate a framework or grid with the partial fault 506A. Rather, the partial fault 506A may be extended to boundary 508A.

In one example, any fault may be extended until it intersects another fault or boundary in accordance to the specified order, but the throw or horizon displacements is set to zero beyond the location where the fault dies out. Specifically, the model is meshed, gridded, or both to the extended faults in their entirety, within the limits of the model boundary. The horizon interpretation may take care of the virtual throws because the horizons are interpreted as continuous surfaces unless intersected by a fault. However, the horizon partitions are independently represented with implicit functions without provisions for continuity. A partial fault extended beyond its control may likely exhibit artifacts due to the extrapolation of the independent representations of horizon partitions.

In one example, the horizon representations for the two partitions may be blended in the region beyond the partial fault. A clipping surface 500A may provide a mechanism to denote either the location within the model that a partial fault exists or its superfluous extension. The clipping surface 500A may be used to limit the tessellation to the partial fault, and to blend the horizon partitions in the region outside of the clipping surface 500A. Thus, the clipping surface 500A truncates the tessellation. Outside of the clipping surface 500A, the two partitions may be blended together, for example, by a distance weighted combination of the respective implicit functions.

The method for tessellating the horizons may not be changed, except for the substitution of the implicit functions by their weighted combination. The combination may be an implicit function or radial basis function expansion that contains an additional set of location dependent weighting coefficients.

If two partitions separated by the extension of a partial fault are represented by $F(x)=\Sigma w_i f_i(\|x-c_i\|)$ and $G(x)=\Sigma v_j g_j(\|x-c_j\|)$, then their combination can represented by $\alpha(x)F(x)+\beta(x)G(x)=\Sigma\alpha(x)w_i f_i(\|x-c_i\|)+\Sigma\beta(x)v_j g_j(\|x-c_j\|)$. Preferably, the dependences on location $\alpha(x)$ and $\beta(x)$ are implemented as dependences on distance from the fault. Preferably, $\alpha(x)$ and $\beta(x)$ have a range between zero and one and sum to one. In some example, the sign of the implicit function for the fault is used to aid the blending.

As shown in FIG. 5A, partial fault 506A may be augmented with the clipping surface 500A. Both the partial fault 506A and the clipping surface 500A are extended by conversion to the implicit function representations 506B and 500B. Tessellation to the surfaces yields the framework consisting of boundary 508C, the major fault 502C crossing the entire model, the minor fault 504C terminated by the major fault 502C and the boundary 508C, and the partial fault 506C terminated by the major fault 502C only.

Figure 6A:
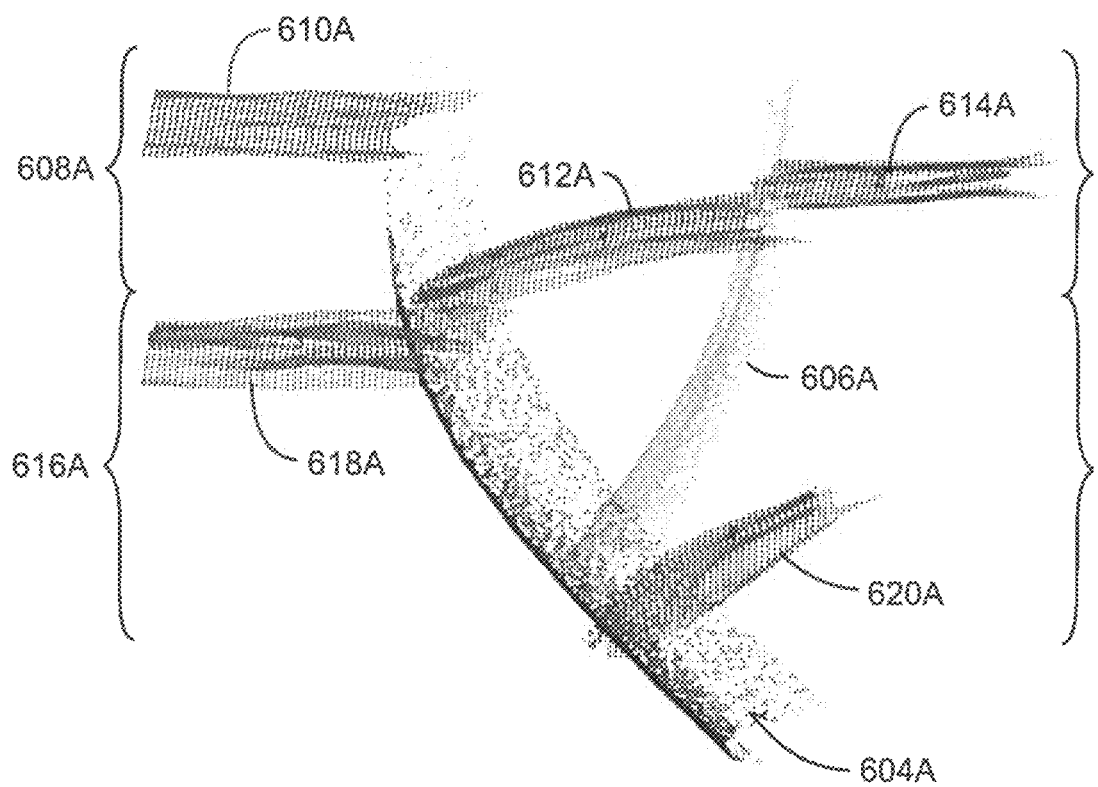
FIGS. 6A to 6C are schematic diagrams of the construction of a framework using the techniques described herein.
Figure 6B:
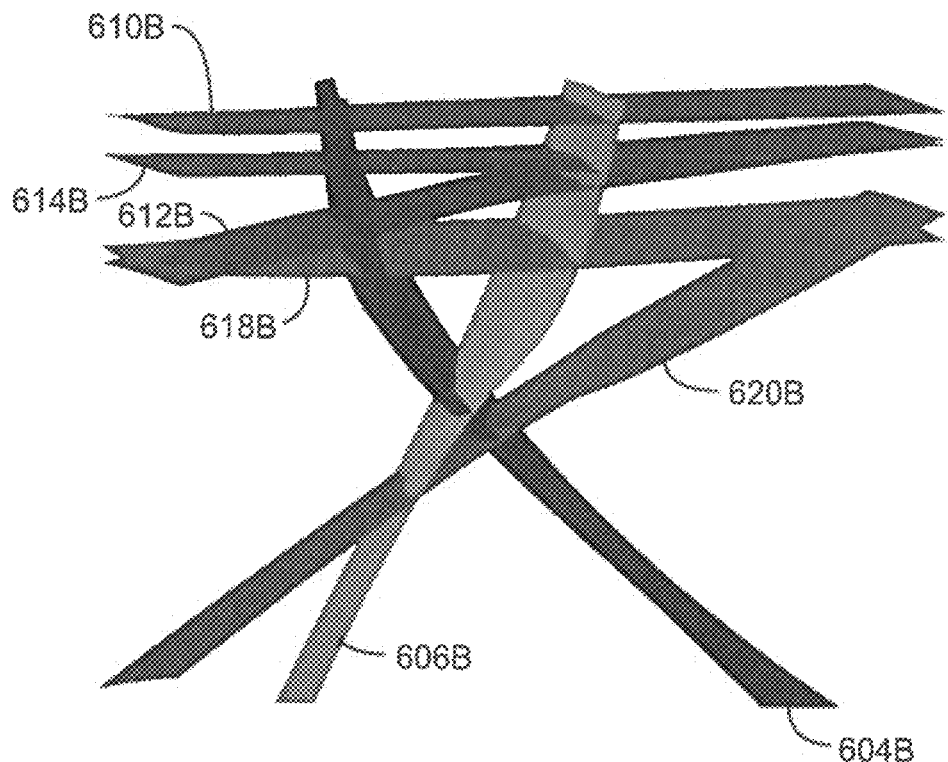
Figure 6C:
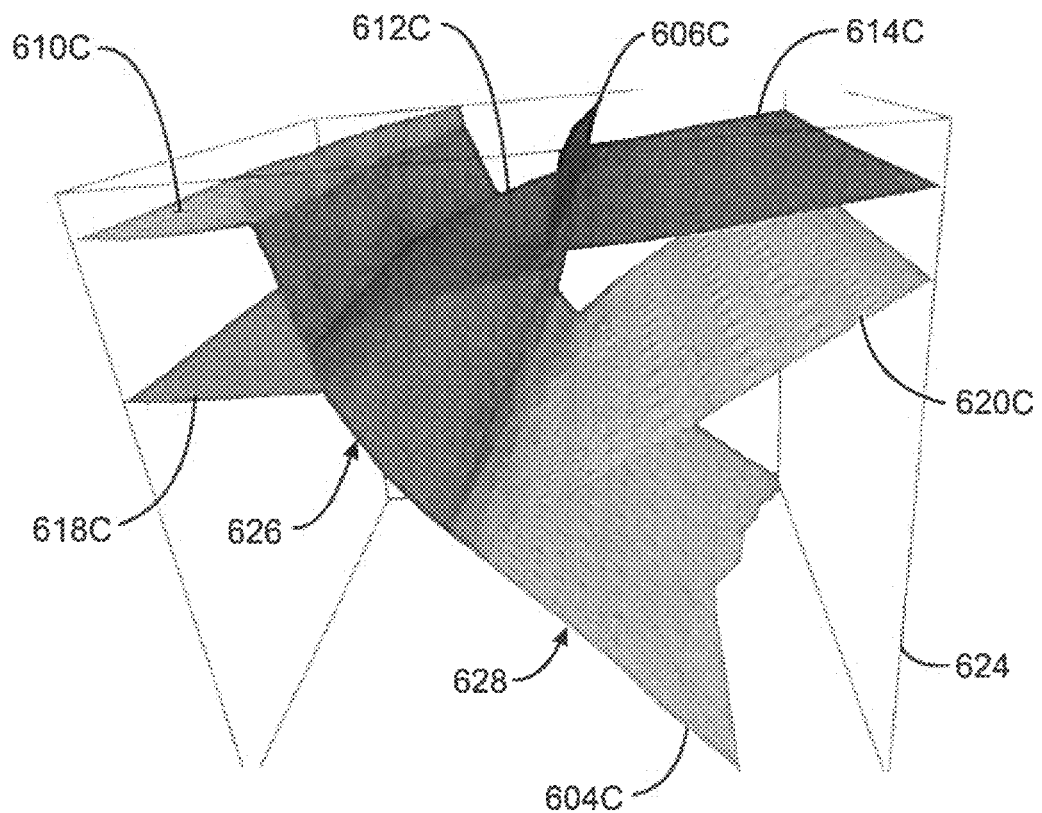

FIGS. 6A to 6C are schematic diagrams of an example of the construction of a structural model using the method described herein. Chart 602A shows the discretized data points of the inputted surfaces. The data points were originally created by interpretation of the seismic data and have a number of places that do not cleanly terminate in other surfaces. The example includes the major fault 604A, the minor fault 606A, a horizon 608A that includes partitions 610A, 612A, and 614A, and another horizon 616A that includes partitions 618A, and 620A. An additional partition was detected, but was not observed on the data in this example. However, a small perturbation of major fault 604A or minor fault 606A may suffice to bring it into existence on the present data. Another way to bring it into existence may be by extending the footprint of the data. The horizon partitions generally end near the faults, but the intersections are not well defined and the partitions cross through faults.

Following the method 200 of FIG. 2, the surfaces or partitions thereof are converted to the implicit functions rendered in chart 602B of FIG. 6B. The implicit function representations may be radial basis functions. The major fault 604A is represented by implicit function 604B. The minor fault 606A is represented by implicit function 606B. While the minor fault 606A is terminated at the major fault 604A, the implicit function 606B is extended and crosses through implicit function representation 604B. Perturbing the faults 604A or 606A, for example, by moving the discretized data points in x, y, and z, may open a gap or create a penetration, necessitating the manual addition or removal of points. However, perturbing the implicit functions 604B or 606B may only change details of their intersection.

Horizon 608A is represented by implicit function representations 610B, 612B, and 614B. Each of these implicit functions spans at least the area of interest of the model. A small perturbation of horizon 608A or faults 604A and 606A, may open gaps or create penetrations. However, a perturbation of implicit function representations 604B, 606B, 610B, 612B, or 614B may merely change the details of the intersections. The situation is similar for horizon 616A represented by implicit function representations 618B and 620B.

The unobserved partition may not be instantiated as an implicit function until the structural model is perturbed to such a degree that it comes into existence within the specified model boundary. Because it was unobserved, there are no data points associated with this partition. However, a user may specify data if instantiation of the unobserved partition is desirable.

The user or the system may specify the order that the surfaces truncate each other. This may provide an automatic building of hierarchies. The truncated surfaces of the model may then be tessellated to the implicit functions in accordance to the specified order. The results of the truncation and tessellation are shown in the chart 602C of FIG. 6C. The result is a triangular mesh that includes the fault meshes 604C and 606C, and the horizon meshes of the first horizon 608A, including the horizon meshes 610C, 612C, and 614C. The triangular mesh also includes the horizon meshes 618C and 620C of the second horizon 616A. The boundary 624 of the volume of interest boundary may also include a mesh, but this is not shown in FIG. 6C in order to simplify the figure.

The boundary meshes may also be segmented into parts that terminate on intersections with other surfaces. For example, the fault mesh 604C may include six parts formed by each intersecting surface contacting the fault mesh 604C. For example, the fault mesh 604C may include two large partitions 626 and 628 as well as four smaller partitions, which are not labeled in this figure. In some examples, boundary meshes are segmented into parts bounded by intersections with other meshed surfaces (or their meshed segments).

Figure 7:
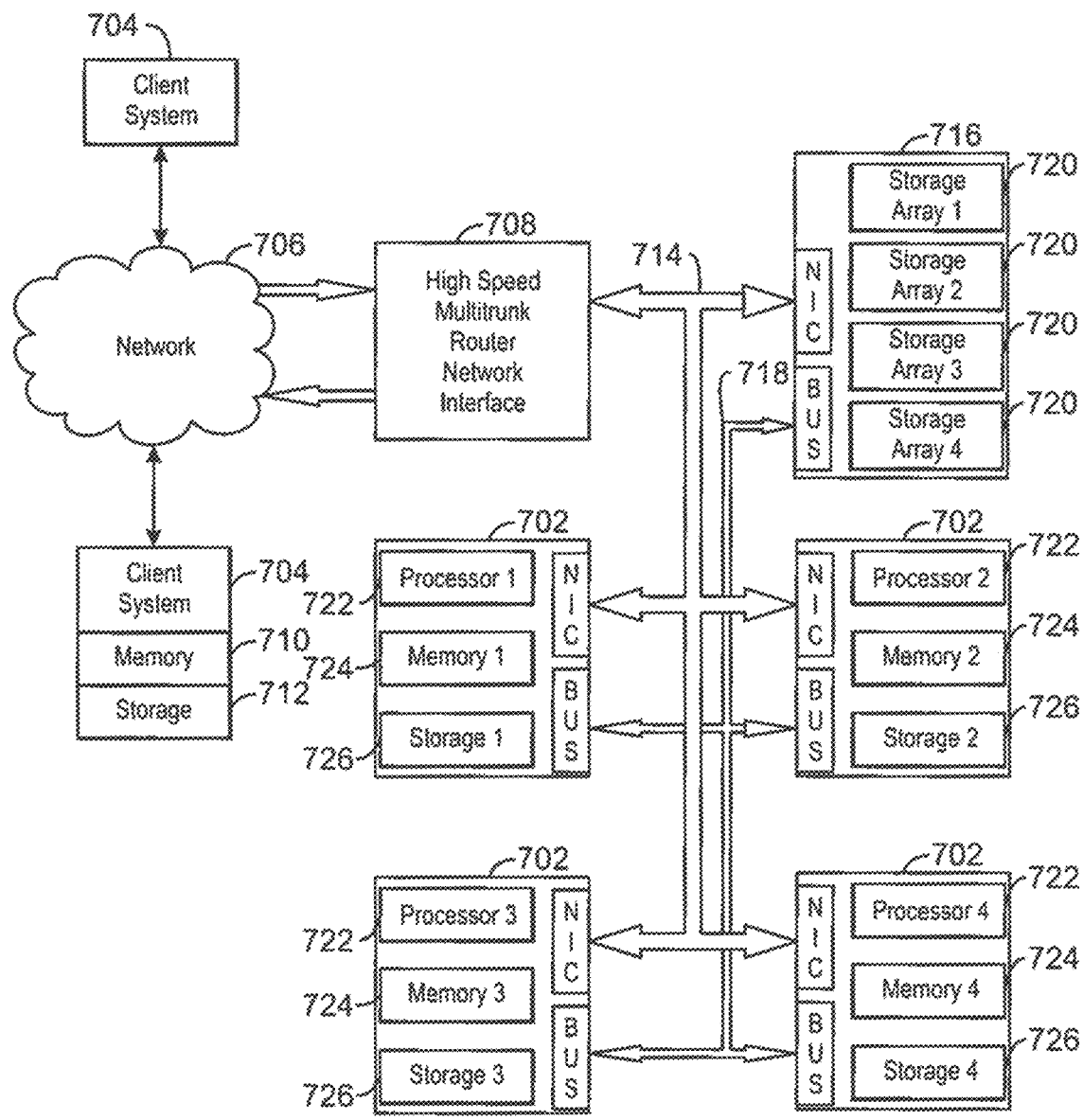
FIG. 7 is a block diagram of an exemplary cluster computing system that may be used to create implicit structural models.

An example of a cluster computing system is shown in FIG. 7. FIG. 7 is a block diagram of an example of a cluster computing system 700 that may be used to create implicit structural models. The cluster computing system 700 illustrated has four computing units 702, each of which may perform calculations for part of a structural model, a simulation model, or both. However, the present techniques are not limited to this configuration, as any number of computing configurations may be selected. For example, a small structural model may be built using a single computing unit 702, such as a workstation, while a large structural model, including numerous horizons, faults, and other surface, may be run on a cluster computing system 700 having 10, 100, 1000, or even more computing units 702. In some examples, each of the computing units 702 may build the structural model for a single region of interest. However, allocation of the computing units 702 may be performed in any number of ways. For example, multiple subdomains may be allocated to a single computing unit 702 or multiple computing units 702 may be assigned to a single subdomain, depending on the computational load on each computing unit 702.

The cluster computing system 700 may be accessed from one or more client systems 704 over a network 706, for example, through a high speed network interface 708. Each of the client systems 704 may have non-transitory, computer readable memory 710 for the storage of operating code and programs, including random access memory (RAM) and read only memory (ROM). The operating code and programs may include the code used to implement all or portions of the methods discussed with respect to FIGS. 2 to 6C. The client systems 704 can also have other non-transitory, computer readable media, such as storage systems 712. The storage systems 712 may include one or more hard drives, one or more optical drives, one or more flash drives, any combinations of these units, or any other suitable storage device. The storage systems 712 may be used for the storage of code, models, data, and other information used for implementing the methods described herein.

The high-speed network interface 708 may be coupled to one or more communications busses in the cluster computing system 700, such as a communications bus 714. The communication bus 714 may be used to communicate instructions and data from the high-speed network interface 708 to a cluster storage 716 and to each of the computing units 702 in the cluster computing system 700. The communications bus 714 may also be used for communications among computing units 702 and the storage array 716. In addition to the communications bus 714 a high-speed bus 718 can be present to increase the communications rate between the computing units 702, the cluster storage 716, or both.

The cluster storage 716 can have one or more non-transitory, computer readable media devices, such as storage arrays 720 for the storage of data, visual representations, results, code, or other information, for example, concerning the implementation of and results from the method of FIG. 2. The storage arrays 720 may include any combinations of hard drives, optical drives, flash drives, holographic storage arrays, or any other suitable devices.

Each of the computing units 702 can have a processor 722 and associated local non-transitory, computer readable media, such as memory 724 and storage 726. The memory 724 may include ROM and/or RAM used to store code, for example, used to direct the processor 722 to implement the method of FIG. 2, for example, as illustrated by FIGS. 3A to 6C. The storage 726 may include one or more hard drives, one or more optical drives, one or more flash drives, or any combinations thereof. The storage 726 may be used to provide storage for intermediate results, data, images, or code associated with operations, including code used to implement the methods of FIGS. 2 to 6C.

The present techniques are not limited to the architecture of the cluster computer system 700 illustrated in FIG. 7. For example, any suitable processor-based device may be utilized for implementing all or a portion of embodiments of the present techniques, including without limitation personal computers, laptop computers, computer workstations, GPUs, mobile devices, and multi-processor servers or workstations with (or without) shared memory. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Figure 8:
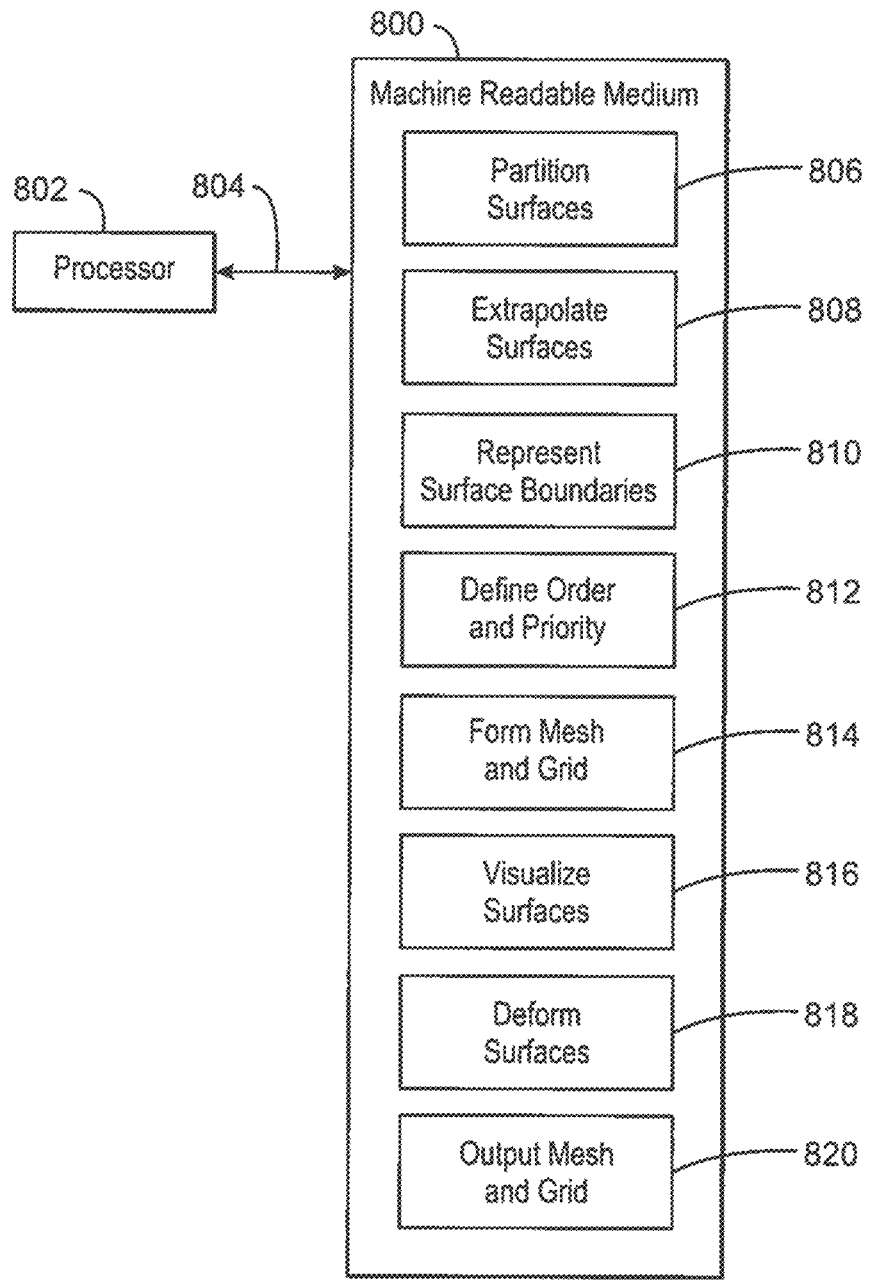
FIG. 8 is a block diagram of an exemplary non-transitory, machine readable medium including code that, when executed by processor, directs the processor to perform operations of the methods described herein.

FIG. 8 is a block diagram of an example of a non-transitory, machine readable medium 800 including code that, when executed by processor 802, directs the processor to perform operations of the method described herein. As described with respect to FIG. 7, the processor 802 may be a single processor, a multicore processor, a distributed processing system, and the like. The machine readable medium 800 may include any of the media described with respect to FIG. 7, such as hard drives, optical drives, flash drives, and the like. The processor 802 may access the machine readable medium 800 over a bus 804, or other data connection, as described with respect to FIG. 7. This may include, for example, computer buses, such as a PCI (peripheral component interconnect) bus, a PCIe (peripheral component interconnect express) bus, point-to-point interconnects, and the like. Other types of communications connections, such as network connections, high-speed network connections, optical fiber connections, and the like, may be used to access the machine readable medium 800.

The machine readable medium 800 may include code 806 to direct the processor 802 to partition surfaces, as described herein. Code 808 may be included to direct the processor 802 to extrapolate surfaces, for example, after the surfaces have been reduced to a mathematical representation, for example, using implicit function, by other code 810. Code 812 may be included to direct the processor 802 to define an order and priority for the surfaces, for example, to determine which surfaces terminate other surfaces and what side of terminating surfaces the other surfaces exist.

The machine readable medium 800 may include code 814 to direct the processor 802 to form a mesh, a grid, or both on surfaces or within zones defined by those surfaces. Code 816 may be included to direct the processor to visualize surfaces, meshes, grids, and the like, to allow a user to modify structural model, for example, to explore different scenarios. As part of exploring the different scenarios, code 818 may be included to direct the processor 802 to deform surfaces, for example, under the control of a user or an algorithm. The code 818 may allow a surface to be rigidly deformed, for example, being shifted or rotated, wherein the relationship between each of the points on the surface remains the same. Further, the code 818 may allow a surface to be non-rigidly deformed, for example, by being scaled, rotated, tilted, curved, recalculated with a new function, and the like.

The machine readable medium 800 may include code 820 to direct the processor 802 to output the structural model, including, for example, a mesh, grid, or both calculated for the surfaces. The code 820 may direct the processor 802 to provide the structural model by saving the structural model to an expected location in the storage, or by exporting the structural model in a form that can be used as input by another software package, such as a simulation model.

The machine readable medium 800 does not need to include all of the code 806 to 820 described herein. For example, the code 816 to visualize surfaces may not be included if the generation of the structural model is immediately followed by the simulation model. Further, additional code may be included to perform other functions. For example, code may be included to direct the processor to generate and use a clipping surface for faults that may not extend the boundaries of a volume of interest. The code in the machine readable medium 800 may also be arranged in different combinations than described here while remaining in the scope of the present claims.

While the present techniques may be susceptible to various modifications and alternative forms, the exemplary embodiments discussed above have been shown only by way of example. However, it should again be understood that the present techniques are not intended to be limited to the particular embodiments disclosed herein. Indeed, the present techniques include all alternatives, modifications, and equivalents falling within the true spirit and scope of the appended claims.

The invention claimed is:

1. A method for constructing a structural model of a subsurface, comprising:
    obtaining discretized data comprising surfaces, wherein the surfaces indicate one or more of horizons, faults, model boundaries, or fluid contacts;
    segmenting a portion of the surfaces in the discretized data by other surfaces in the discretized data based on intersections between the surfaces to form corresponding segments;
    fitting the discretized data corresponding to each of the segments to an implicit function, wherein the implicit function for each of the segments comprises a radial basis function;
    for a portion of the segments, combining implicit functions for two or more segments into a single implicit function to enforce constraints between the two or more segments, wherein the combined implicit function for each of the two or more segments comprises a radial basis function;
    creating corresponding implicit surfaces from the implicit functions and the combined implicit functions, wherein creating the implicit surfaces comprises thresholding the implicit functions and the combined implicit functions;
    extrapolating at least one of the implicit surfaces to a boundary of a region of interest, wherein the extrapolation comprises selecting a number of terms in the radial basis function that is being extrapolated, specifying a convergence criterion for the radial basis function that is being extrapolated, and identifying a center of the radial basis function that is being extrapolated;
    creating corresponding model surfaces from the implicit surfaces, wherein creating the model surfaces comprises intersecting the implicit surfaces by truncating the implicit surfaces in contact with other implicit surfaces;
    constructing the structural model from the model surfaces, wherein the structural model is interactively modified by allowing at least one of the model surfaces to be rigidly deformed or non-rigidly deformed; and
    visualizing the structural model.

2. The method of claim 1, wherein constructing the structural model comprises tessellating each of the model surfaces to form a mesh over each.

3. The method of claim 1, wherein constructing the structural model comprises tessellating zones formed between each of the model surfaces to form a three-dimensional grid of cells in the zones.

4. The method of claim 1, further comprising determining a contact point between a horizon and a fault by an intersection of an implicit surface.

5. The method of claim 1, further comprising perturbing a model surface using a non-rigid transformation of an implicit function representing the model surface, wherein the model surface corresponds to a fault or a horizon.

6. The method of claim 5, wherein perturbing the model surface comprises at least one of scaling the model surface, shifting the model surface to a new location in the structural model, and rotating the model surface.

7. The method of claim 1, further comprising perturbing a model surface using a rigid transformation of an implicit function representing the model surface, wherein the model surface corresponds to a fault or a horizon.

8. The method of claim 7, wherein perturbing the model surface comprises adjusting a depth value.

9. The method of claim 1, wherein visualizing the structural model comprises rendering the model surfaces using a ray tracing visualization.

10. The method of claim 1, wherein visualizing the structural model comprises rendering the model surfaces using a volume renderer.

11. The method of claim 1, further comprising obtaining input for a perturbation of a model surface.

12. The method of claim 11, further comprising obtaining input for a contact order, a contact priority, or both for a model surface.

13. The method of claim 1, further comprising using the structural model in hydrocarbon operations.

14. The method of claim 13, further comprising causing a well to be drilled based, at least in part, on the structural model.

15. A system for constructing a structural model, comprising:
    processors:

a storage medium comprising discretized data comprising surfaces, wherein the surfaces indicate one or more of horizons, faults, model boundaries, or fluid contacts; and a machine-readable medium comprising instructions configured to direct at least one of the processors to:

obtain the discretized data from the storage medium;

segment a portion of the surfaces in the discretized data by other surfaces in the discretized data based on intersections between the surfaces to form corresponding segments;

fit the discretized data corresponding to each of the segments to an implicit function, wherein the implicit function for each of the segments comprises a radial basis function;

for a portion of the segments, combining implicit functions for two or more segments into a single implicit function to enforce constraints between the two or more segments, wherein the combined implicit function for each of the two or more segments comprises a radial basis function;

create corresponding implicit surfaces from the implicit functions and the combined implicit functions, wherein creating the implicit surfaces comprises thresholding the implicit functions and the combined implicit functions;

extrapolate the at least one of the implicit surfaces to a boundary of a region of interest, wherein extrapolating comprises selecting a number of terms in the radial basis function that is being extrapolated, specifying a convergence criterion for the radial basis function that is being extrapolated, and identifying a center of the radial basis function that is being extrapolated;

create corresponding model surfaces from the implicit surfaces, wherein creating the model surfaces comprises intersecting the implicit surfaces by truncating the implicit surfaces in contact with other implicit surfaces;

create a structural model from the model surfaces, wherein the structural model is interactively modified by allowing at least one of the model surfaces to be rigidly deformed or non-rigidly deformed; and store the structural model to the storage medium or display the structural model on a display.

16. The system of claim 15 wherein the machine-readable medium comprises instructions configured to direct at least one of the processors to tessellate the truncated implicit surfaces to form a mesh over the truncated implicit surfaces or to tessellate a zone formed by truncated implicit surfaces to form a three-dimensional grid of cells within the zone.

17. The system of claim 16, wherein the machine-readable medium comprises instructions configured to direct at least one of the processors to tessellate the truncated implicit surfaces to form a mesh over the truncated implicit surfaces and extend the mesh into a zone formed by the truncated implicit surfaces to form a three-dimensional grid of cells within the zone.

18. The system of claim 15, further comprising a client system, and wherein the machine-readable medium comprises instructions configured to direct at least one of the processors to display the structural model at the client system.

19. The system of claim 18, wherein the machine-readable medium further comprises instructions configured to direct at least one of the processors to obtain instructions from the client system for perturbing an implicit surface.

20. The system of claim 19, wherein the machine-readable medium further comprises instructions configured to direct at least one of the processors to regenerate the structural model after an implicit surface has been perturbed.

21. The system of claim 15, wherein the machine-readable medium further comprises instructions configured to direct at least one of the processors to generate a simulation model from the structural model.

\* \* \* \* \*